Oct. 15, 1946.  W. C. ROSENTHAL ET AL  2,409,516
IMPLEMENT ATTACHING DEVICE
Filed July 12, 1944

Inventors:
William C. Rosenthal
and Clarence A. Hubert.
By Paul O. Pippel
Atty.

Patented Oct. 15, 1946

2,409,516

UNITED STATES PATENT OFFICE 2,409,516

IMPLEMENT ATTACHING DEVICE

William C. Rosenthal and Clarence A. Hubert, Chicago, Ill., assignors to International Harvester Company, a corporation of New Jersey Application July 12, 1944, Serial No. 544,612

3 Claims. (Cl. 151—32)

This invention relates to the attachment of implements to tractors and the like, and has particular reference to a tractor having improved means for the quick attachment and removal of implements.

It is known, particularly in the agricultural industry, to provide capscrews on tractors and the like for the attachment of implements, the capscrew forming a part of the tractor supporting structure and remaining therewith when the implement is removed to be replaced by another implement, or to free the tractor for the performance of other duties. The capscrew is usually inserted into a tapped opening in the tractor body, and one of the principal objections thereto has been the tendency of the screw to become unseated from the tractor body when not in use, and to be lost particularly when a blind opening is provided. The customary procedure to prevent unthreading of the screw from its seat when a blind opening is provided has been to tighten it and rely upon the frictional engagement of the head with the tractor body. However, the human factor is variable and the loss of many capscrews has testified to the failure of this procedure. Likewise, where the end of the screw extends through the retaining structure, a cotter pin is often provided to retain the screw. However, this method is feasible only if sufficient clearance is provided for the end of the screw. In many instances the tapped opening must be blind, and to prevent the loss of capscrews presents a more complex problem. The present invention solves this problem simply and effectively.

An object of the present invention is to provide an improved capscrew and seat construction for a tractor or the like to facilitate the attachment of implements thereto.

Another object is to provide connecting means for the quick attachment of an implement to a tractor, or the like, which connecting means may be readily removed from the tractor, if desired, and as quickly replaced, but will not become unseated as a result of the shocks to which the tractor may be subjected.

Other objects and advantages will become clear from the detailed description to follow when read in conjunction with the accompanying drawing, wherein.

Figure 1:
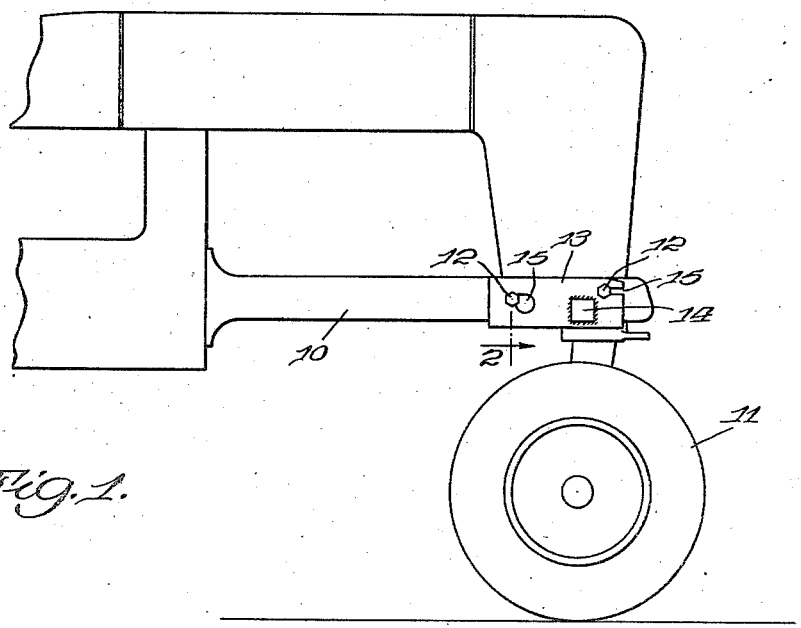
Fig. 1 is a view in side elevation of the front end of a tractor with the device of the present invention incorporated therein.

Referring to the drawing, numeral 10 designates a longitudinal extending body portion of a tractor having front wheels 11. Attached to the forward end of the tractor and to the side thereof, by bolts 12, is an implement attaching plate 13, having a laterally extending tool bar 14 welded thereto for the mounting of implements. It will be noted that openings 15 are provided in plate 13 for securing the plate between the tractor body and the heads of the bolts 12. The openings 15 are preferably countersunk to receive the tapered portion of the bolt-head, as seen in Fig. 2.

Figure 2:
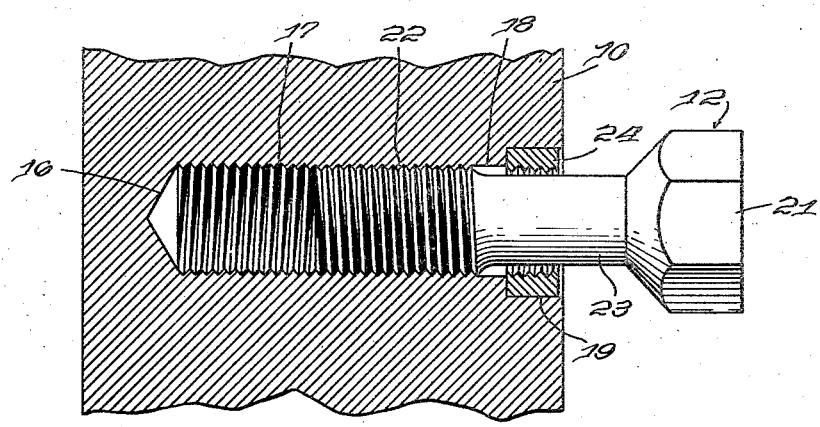
Fig. 2 is a section taken along the line 2 of Fig. 1 and showing the seating of the capscrew in the body of the tractor.
Figure 3:
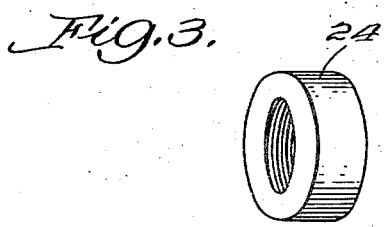
Fig. 3 is a perspective view of the seating collar.

Referring particularly to Figure 2, it may be noted that the body of the tractor 10 has been provided with a tapped opening or threaded recess 16 having threads 17 and an unthreaded portion 18 adjacent the mouth thereof. The opening is further provided with a counterbore 19 for a purpose which will hereinafter become clear.

Adapted to be received in tapped opening 16 is a bolt 12 having a tapered head 21, a threaded shank 22, and a neck portion 23 having a diameter less than the minor diameter of threaded portion 22.

Adapted to be threaded upon the shank 22 of bolt 12 is a retaining collar 24, the outer diameter of which is slightly greater than the diameter of counterbore 19.

As pointed out before, it is important to provide against loss of the capscrew from the tractor upon removal of the implements and the attaching plate therefrom. To solve this problem, applicant threads collar 24 upon the shank 22 of his bolt until the neck portion 23 is reached. Since the diameter of neck portion 23 is less than the diameter of the collar, the collar rests loosely thereupon. The bolt is then inserted into the tapped opening 16 and threaded therein until collar 24 is pressed between the bolt-head 21 and the tractor body 10. As already noted, collar 24 is slightly greater in outer diameter than the diameter of counterbore 19. However, the periphery of the collar is preferably slightly beveled in order to facilitate its insertion into the counterbore. The bolt is then screwed into position, the pressure applied against the collar 24 forcing it into the counterbore. The collar is then separated from the tapped portion of the opening 16 by the unthreaded portion 18.

Since there is little likelihood of the threads of collar 24 being in phase with the threads of shank 22, after insertion of the collar in counterbore 19, bolt 12 cannot be entirely unscrewed from the tapped opening 16 without the exercise of force sufficient to unseat the collar 24. In order to insure that the collar 24 will be out of phase with the shank 22, the operator is required only to adjust the circumferential position of the collar in the counterbore 19. Therefore, when bolt 12 becomes loosened as a result of the jarring of the tractor and the like, the bolt will only be withdrawn until the threads of shank 22 contact collar 24, whereupon the collar serves as a stop and inhibits further withdrawal of the bolt.

Applicant has thus devised a simple, novel, and efficient capscrew and seating combination for a tractor, wherein the capscrew may be removed readily, if desired, but is retained with the tractor and the loss thereof, due to the bolt shaking loose from the tractor, prevented.

Having described the invention, it should be understood that modifications may be made therein without departing from the spirit of the invention or the scope of the appended claims.

What is claimed is:

1. In a work piece or support, a threaded recess, a coaxial unthreaded section and counterbore adjacent the mouth thereof, each of progressively larger diameter, a headed screw having a threaded end fitted in the recess with a neck portion of lesser diameter, the threaded end being of greater axial length than said unthreaded section and a retaining collar, internally threaded, tightly seated in the counterbore with the threads out of phase with the threads of the recess.

2. In a work piece or support, a threaded recess, a coaxial unthreaded section and counterbore adjacent the mouth thereof, each of progressively larger diameter, a headed screw having a threaded end fitted in the recess with a neck portion of lesser diameter, the threaded end being of greater axial length than said unthreaded section, said screw being adapted to be partly withdrawn to receive attaching elements between the screw head and the support, and means for inhibiting removal of the screw from the support comprising an internally threaded collar frictionally held in said counterbore with the threads out of phase with the threads of the recess.

3. In a work piece or support, a threaded recess, a coaxial unthreaded section and counterbore adjacent the mouth thereof, each of progressively larger diameter, a headed screw having a threaded end fitted in the recess with a neck portion of lesser diameter, the threaded end being of greater axial length than said unthreaded section, and a retaining collar frictionally held in the counterbore and engageable with the threaded portion of the screw to inhibit withdrawal thereof.

WILLIAM C. ROSENTHAL.
CLARENCE A. HUBERT.